United States Patent Office 3,517,049
Patented June 23, 1970

3,517,049
ISOLATION OF L-α-(E,4-DI-METHOXYBENZYL)-α-ALANINE METHYLESTER
Laszlo A. Suranyi, Mannheim, and Richard Cyrus, Ludwigshafen (Rhine), Germany, assignors to Knoll A.G. Chemische Fabriken, Ludwigshafen (Rhine), Germany
No Drawing. Filed May 2, 1967, Ser. No. 635,399
Int. Cl. C07c 101/08
U.S. Cl. 260—471    1 Claim

ABSTRACT OF THE DISCLOSURE

Extraction of the hypotensively active L-antimer of racemic α-(3,4-dimethoxybenzyl)-α-alaninemethyl ester by treatment of the racemate with dibenzoyl-L-tartaric acid in combination with an inorganic acid such as hydrochloric acid to form the more difficultly soluble L-antimer-dibenzoyl-L-hydrogen tartrate, separation and acid hydrolysis thereof.

---

This invention relates to a method of isolating L-α-(3,4-dimethoxybenzyl)-α-alanine methyl ester and to a process for isolating it from a racemate thereof.

All known methods of synthesizing α-(3,4-dihydroxybenzyl)-α-alanine, also known as α-methyl-DOPA, result in first obtaining the racemic form of the amino acid. In order to isolate the physiologically active L-form of this compound from this racemate, it is acylated and then reacted with an optically active base to form diastereomeric salt pairs. Isolation is also possible after blocking the carboxyl group and forming the salt pairs with suitable optically active acids.

It has been found that racemic α-(3,4-dimethoxybenzyl)-α-alanine methyl ester, obtainable, for example, by the process described in U.S. application Ser. No. 581,738, filed Sept. 26, 1966, can advantageously be treated to isolate the physiologically active L-antimer by converting the racemate into the diastereomeric salt pair with dibenzoyl-L-tartaric acid and an inorganic acid capable of forming a readily soluble salt with the D-antimer, then resolving the more difficultly soluble salt of the L-antimer by acid hydrolysis after separation of the mother liquor. This is suprising because the D-antimers of amino acid esters frequently form the more difficultly soluble salt with dibenzoyl-L-tartaric acid whereas the physiologically valuable L-antimer can be extracted from the mother liquor only with great difficulty. Yields of optical, pure grades of L-amino acids generally are only between 50 and 80%.

In the method of the invention, the physiologically active L-antimer, i.e., L-α-(3,4-dimethoxybenzyl)-α-alanine methyl ester, which alone is useful as an intermediate in the preparation of the hypotensively active L-α-(3,4-dihydroxybenzyl)-α-alanine, can be recovered in pure form without recrystallization and in yields of 95 to 96% as the difficultly soluble salt; forming the diastereomeric salts with dibenzoyl-L-tartaric acid and in addition, an inorganic acid which forms an easily soluble salt with the D-antimer. Hydrochloric acid is an example of an inorganic acid suitable for this purpose.

Detailed descriptions of the method of the invention follow:

FORMATION OF THE DIASTEREOMERIC SALT PAIR 205 g. (2 mols) racemic α-(3,4-dimethoxybenzyl)-α-alanine methylester are heated to about 55° C. while stirring with 74.9 ml. (0.9 mol) hydrochloric acid (d.=1.190) and 600 ml. methanol in a four liter, three necked flask equipped with stirrer, therometer and reflux cooler. To this is added, slowly, and while stirring, a solution at about 50° C. of 500 g. dibenzoyl-L-tartaric acid monohydrate in one liter methanol. The temperature rises during the admixture and after about five minutes recrystallization of the L-salt begins at the reflux with gentle boiling. Heating is continued for one hour to boiling under reflux, the whole is cooled while stirring and allowed to stand for 12 hours at 0° C.

The crude crystalline suspension is suction filtered, once with 100 ml. methanol, then with 50:50 by volume 100 ml. methanol diisopropylether, and finally with 100 ml. diisopropylether, and dried at 60° C. The yield of L-α-(3,4-dimethoxybenzyl)-α-alanine-methyl-ester dibenzoyl-L-hydrogen tartrate is 584 g. (95.5% theoretical), the melting point is 192–193° C., with decomposition.

Optical rotation:
   $[\alpha]_D^{20} = -26.5° \pm 0.5°$, 5% conc. in dimethylsulfoxide.
   $[\alpha]_D^{20} = -30° \pm 1.0°$, 5% conc. in dimethyformamide.

*Analysis.*—Calculated (percent): C, 61.0; H, 5.4; N, 2.29. Found (percent): C, 60.93; H, 5.64; N, 2.24.

The advantages resulting from the method of the invention are obvious when compared with the process for the production of L-α-(3,4-dimethoxybenzyl)-α-alanine-methyl-ester dibenzoyl-L-hydrogen tartrate using only dibenzyl-L-tartaric acid. The following example giving an 80% yield only demonstrates the advantages of the method of the invention.

A solution of 17.7 g. racemic α-(3,4-dimethoxybenzyl)-α-alanine methyl ester (M.P. 70–71° C.) in 15 ml. methanol is added to a solution of 26.3 g. dibenzoyl-L-tartaric acid monohydrate (M.P. 84–87° C., $[\alpha]_D^{20} = -113.7°$, conc. 2% in methanol) in 50 ml. methanol. L-α-(3,4-dimethoxybenzoyl)-α-alanine-methylester - dibenzoyl - L - hydrogen tartrate begins to crystallize in ten minutes. This crystallizate is stored for twelve hours at 0° C., filtered, washed with methanol and dried. The yield of crude product is 23.3 g. (108.8% theoretical). It has a melting point, with decomposition, at 186–187° C.

The crude product is stirred for thirty minutes at 50° C. in 100 ml. methanol, cooled at 0° C., filtered and dried to obtain 17.1 g. (78.8% theoretcial yield) pure L-α-(3,4-dimethoxybenzyl)-α-alanine - methylester - dibenzoyl-L-hydrogen tartrate having a melting point, with decomposition, at 192–193° C. and an optical rotation, in 5% conc. in dimethylsulfoxide, of $[\alpha]_D^{20} = -26° \pm 0.5°$.

Decomposition of L-α-(3,4-dimethoxybenzyl)-α-alanine-methylester-dibenzoyl-L-hydrogen-tartrate 584 g. (0.955 mol) L-α(3,4-dimethoxy-benzyl)-α-analine-methylester-dibenzoyl - L - hydrogen tartrate is stirred at room temperature in 950 ml. 2 N-hydrobromic acid and 3.5 l. diisopropylether until completely dissolved. The hydrobromic acid solution is separated and extracted with 250 ml. diisopropylether. Dibenzoyl-L-tartaric acid can be recovered from the combined diisopropylether solutions.

The combined hydrobromic acid solution are shaken with charcoal, filtered and evaporated to dryness under vacuum. The oily residue is practically quantitatively L-α-(3,4-dimethoxybenzyl)-α-alanine-methyl ester-hydrobromide. This product can be converted, without preliminary purification and in known manner, to α-methyl-dopa by reaction with ether-splitting media. The ester has a melting point at 33–35° C., a boiling point, at 0.005 mm. Hg of 115–116° C., and an optical rotation $[\alpha]_D^{20} = +2.5°$ in methanol.

We claim:
1. A process for isolating L-α-(3,4-dimethoxybenzyl)-α-alanine methyl ester from a racemate of said compound which comprises treating the racemate with dibenzoyl-L-tartaric acid and hydrochloric acid capable of forming a readily soluble salt with the D-antimer to form the corresponding diastereomeric salt pair, separating the more difficultly soluble salt of the L-antimer, and subjecting said L-antimer to acid hydrolysis.

References Cited
UNITED STATES PATENTS
3,366,679  1/1968  Reinhold et al. ----- 260—579

LORRAINE A. WEINBERGER, Primary Examiner
L. H. THAXTON, Assistant Examiner

U.S. Cl. X.R.
260—519